USOO5606119A

United States Patent [19]
Wallerand et al.

[11] Patent Number: 5,606,119
[45] Date of Patent: Feb. 25, 1997

[54] METHOD AND APPARATUS FOR DETECTING MISFIRES IN A CONTROLLED IGNITION INTERNAL COMBUSTION ENGINE

[75] Inventors: Philippe Wallerand, Sartrouville; Christophe Genin, Noisiel, both of France

[73] Assignee: Magneti Marelli France, Nanterre Cedex, France

[21] Appl. No.: 481,325

[22] PCT Filed: Jan. 6, 1994

[86] PCT No.: PCT/FR94/00015

§ 371 Date: Jul. 5, 1995

§ 102(e) Date: Jul. 5, 1995

[87] PCT Pub. No.: WO94/16209

PCT Pub. Date: Jul. 21, 1994

[30] Foreign Application Priority Data

Jan. 8, 1993 [FR] France ................................ 93 00143

[51] Int. Cl.⁶ ................................................ G01M 15/00
[52] U.S. Cl. ................................................ 73/117.3
[58] Field of Search ........................ 73/35.03, 35.04, 73/35.06, 116, 117.2, 117.3; 123/419, 436; 364/431.07

[56] References Cited

U.S. PATENT DOCUMENTS 4,691,288  9/1987  Kay et al. ............................ 73/116
4,843,870  7/1989  Citron et al. ........................ 73/116
5,044,194  9/1991  James et al. ........................ 73/117.3
5,200,899  4/1993  Ribbens et al. .................... 73/117.3
5,501,109  3/1996  Naito et al. ........................ 73/116

FOREIGN PATENT DOCUMENTS 2681425  11/1993  France .

Primary Examiner—Richard Chilcot
Assistant Examiner—Eric S. McCall
Attorney, Agent, or Firm—Larson and Taylor

[57] ABSTRACT

Method for producing of catalytic converter diagnostic signals and/or signals indicating that the harmful component emission threshold in exhaust gases has been exceeded. To produce the signal, the gas torque (Cg) for each combustion stroke in each cylinder is determined; the engine speed (N) and air inlet manifold pressure (Pca) during the corresponding previous inlet stroke is measured; the reference torque (C ref), which is a function of N and Pca, is calculated by interpolation from a map; C ref is weighted, for example, by multiplication with a coefficient (K) associated with the corresponding cylinder and/or with the steady or transient engine running mode in order to deduce the expected theoretical torque (Cpr) which is compared with the gas torque (Cg) to ascertain a combustion misfire if Cg/Cpr is less than S2 and if Cpr-Cg exceeds the S3 or S4 threshold, depending on whether the engine is in transient or steady mode.

20 Claims, 3 Drawing Sheets

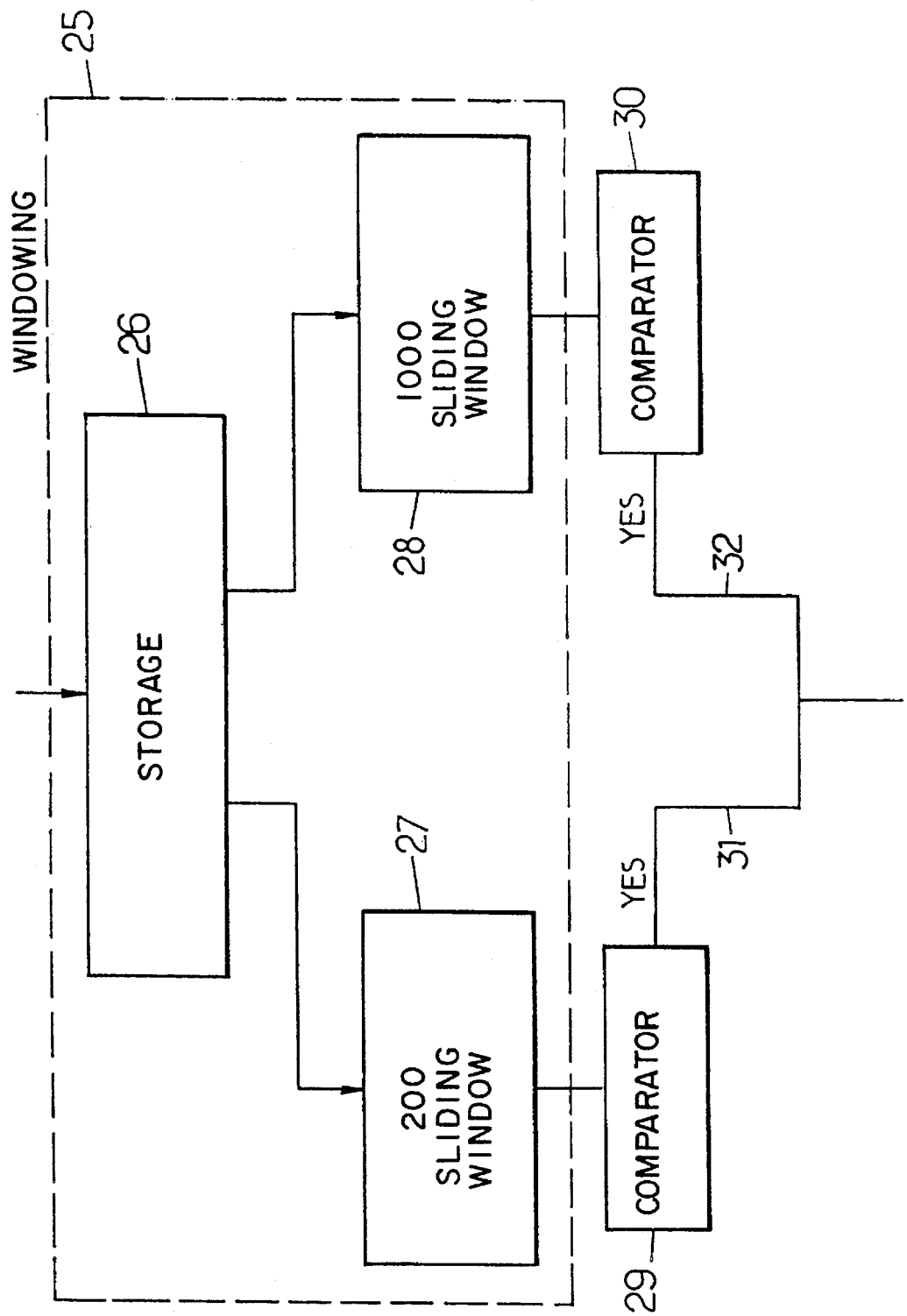

METHOD AND APPARATUS FOR DETECTING MISFIRES IN A CONTROLLED IGNITION INTERNAL COMBUSTION ENGINE

FIELD OF THE INVENTION

U.S. Pat. No. 5,044,194 describes a method of detecting misfires, consisting, for each combustion-expansion phase (power stroke) of an engine, in calculating the rotational acceleration and speed of the engine, then, over a series of such phases, the mean acceleration which is compared with the measured acceleration in order to deduce an acceleration discrepancy therefrom. In parallel, a reference torque value is obtained by map-based interpolation from operating parameters of the engine, such as speed and intake air flow rate. Then a power loss coefficient is calculated, equal to the ratio of the acceleration discrepancy to the reference torque. Then the reference torque is compared with a torque threshold, and if it is higher than the latter, a second comparison is carried out. The latter consists in comparing the power loss coefficient with a power loss threshold, and if this coefficient is higher than the corresponding threshold, it is concluded that there is a misfire. The essential criterion determining the presence of a misfire resides in the power loss coefficient, equal to the ratio of an acceleration discrepancy over a reference torque, and in its comparison with a power loss coefficient threshold.

JP-A-62-54138 also describes a method of detecting misfires consisting in calculating a discrepancy between a pressure measured at the inlet air manifold and a reference pressure obtained by map-based interpolation from detected values of the load on the engine, then in comparing the discrepancy between the measured pressure and the reference pressure with a threshold, in order to deduce therefrom the presence of a misfire. In this method, the essential criterion for determining the presence of a misfire resides in the pressure discrepancy and its comparison with a pressure threshold.

SUMMARY OF THE INVENTION

To this end, the invention proposes a method of detecting misfires in a controlled ignition internal combustion engine, which is characterized in that it comprises the stages consisting in:

a) deriving, for each combustion-expansion phase (power stroke) in each cylinder of the engine, a signal representative of the value of the gas torque Cg produced in the corresponding cylinder by the corresponding combustion, b) measuring the rotational speed N of the engine and deriving a signal representative of this speed during at least the intake phase preceding the combustion-expansion phase of the corresponding cylinder, c) measuring the pressure Pca at the air inlet manifold for the corresponding cylinder, and deriving a signal representative of this pressure during at least the intake phase preceding the combustion-expansion phase in the course of the same engine cycle of the corresponding cylinder, d) entering the speed N and inlet manifold pressure Pca signals as addresses in a map of reference theoretical gas torque, and deducing therefrom a signal representative of a reference torque C ref, e) assigning the reference torque C ref a multiplier weighting coefficient associated with the corresponding cylinder and the steady-state or transient operating mode of the engine, and deducing therefrom a signal representative of an expected theoretical torque Cpr, and f) comparing the signals of the measured gas torque Cg and of the expected theoretical torque Cpr and concluding that there is a misfire when the ratio of the gas torque Cg to the expected theoretical torque Cpr becomes less than a defined ratio threshold.

This ratio threshold may be constant, for example equal to 0.5; however, advantageously, it is drawn from a map established as a function of the rotational speed N of the engine and of the pressure Pca at the air inlet manifold.

It will be understood that the idea at the base of the invention consists, for each combustion-expansion phase, in predicting or estimating an expected theoretical gas torque, as a function of the rotational speed of the engine or engine RPM, of the pressure at the inlet manifold, and of a weighting coefficient, taking into account the state of each of the cylinders of the engine for the corresponding combustion-expansion phases, as well as the modes of transient or steady-state operation of the engine, and that this expected torque is next compared with the gas torque measured for the combustion-expansion phase in question, in order to deduce therefrom whether there is or is not a misfire during this phase, depending on the result of this comparison, which advantageously is twofold.

In fact, for better discrimination of the misfires, it is advantageously concluded that there is a misfire if, simultaneously with the condition mentioned in stage f) above, the difference between the expected torque Cpr and the gas torque Cg is greater than one or other of two defined difference thresholds according to whether the engine is operating in steady-state or transient mode.

Advantageously furthermore, the signal representative of the gas torque Cg measured for each combustion-expansion phase in each cylinder of the engine is derived from the engine speed signal N. This characteristic is advantageous in that it makes it possible to calculate the gas torque from the engine speed signal N alone, without it being necessary to provide other means such as pressure sensors taking pressure measurements in the combustion chambers.

Advantageously furthermore, the reference torque C ref signals are easily deduced from a map of overall torque for all the cylinders of the engine, valid for a family of engines, this map being preestablished in steady-state regime of the engine and stored in memory in the form of a two-dimensional map table expressing values of the reference theoretical gas torque for various values of, on the one hand, the speed of the engine N, and, on the other hand, the pressure at the inlet manifold Pca, which values are chosen in order to optimize the calculation of the reference torque C ref by linear interpolation. The map points or values are in fact chosen close together in the regions with sharp curvatures in the map in order to allow linear interpretation with minimal errors.

So that the weighting of the result of the mapping makes it possible to compensate for the dispersion between cylinders and between engines, as well as for the ageing of the engine, the weighting coefficient is recalculated for each combustion-expansion phase of the engine. However this calculation is performed in a different way according to whether the motor is operating in transient or steady-state mode, the weighting in steady-state regime being performed as a function of the results of the preceding cycles of the cylinder in question.

When the injection and, if appropriate, the ignition of the engine are controlled by an engine control system, a signal representative of the operating mode of the engine is advantageously picked up on an output of this system, which derives such a steady-state or transient operation mode signal for its own requirements.

However, it is equally possible, in parallel with this engine control system, to determine the steady-state or transient operating mode of the engine on the basis of the difference, preferably in absolute value, between two reference torque values Cref, one calculated for the combustion-expansion phase in question, and the other for the last but one preceding combustion-expansion phase, and in concluding that the mode is transient if this difference is greater than a defined mode threshold, and steady-state if this difference is less than the said mode threshold for a defined number of consecutive engine cycles.

In a simple way, in transient mode, the weighting coefficient is calculated as being equal to the mean of a defined number of the last consecutive Cg/C ref ratios, independently of the cylinders, and, in steady-state mode, as being equal to the mean of a defined number of the last consecutive Cg/C ref ratios for the cylinder corresponding to the combustion-expansion phase in question, that is to say that for which Cg is available, and the weighting coefficient is calculated in order to calculate the expected torque from the reference torque.

This updating and individualization mode, in steady state, of the weighting coefficient implies a stage consisting in storing in memory a defined number of the latest successive values of the gas torque Cg and of the reference torque C ref which are necessary for calculating the weighting coefficient. However, furthermore, in order not to introduce an aberrant value of the gas torque Cg, corresponding to exceptional conditions, into the calculation of the weighting coefficient, and thus so as not to falsify this calculation, the corresponding calculated value of the expected torque Cpr is advantageously stored in place of a value of the gas torque Cg if, for this value of Cg, a misfire is detected or if no misfire is detected but this value of Cg is higher than the product of the corresponding value of C ref and an amplification factor, for example a constant preferably equal to 1.2. This latter case (Cg>1.2×C ref) can come about when passing an obstacle, or during a combustion-expansion phase which follows a misfire occurring for the same cylinder, at the preceding engine cycle.

So as to warn the driver of the vehicle, the engine of which is associated with a catalyst, the method moreover advantageously consists in:

measuring the number of misfires or their rates, which are detected during sliding windows of respectively N1 and N2 engine revolutions, for example 200 and 1000 revolutions, comparing each of these measurements with at least one threshold specific to each window, and giving an alarm signal corresponding to a critical state of the catalyst in the event of crossing of the threshold specific to the window of N1 revolutions, and/or an alarm signal corresponding to a crossing of a threshold for emission of noxious components in the exhaust gases in the event of crossing of the threshold specific to the window of N2 revolutions.

With the detection of misfires not being reliable throughout the field of use of the engine, in particular during strong transients (for example gear changes), or when the engine is heavily driven, it is advantageous for the method to be able to make it possible to deactivate the detection of the misfires in an injection cutoff phase and/or in an engine driven phase. According to the invention, this latter phase is advantageously detected when the pressure at the inlet manifold P ca becomes less than a pressure threshold which is a function of the rotational speed N of the engine and/or when the gas torque Cg measured is less than a limit torque, which may correspond, for example, to the gas torque measured with zero useful torque for an identical rotational speed N of the engine.

So as to facilitate the detection of the driving or driven state of the engine, the method advantageously comprises the supplementary stage consisting in entering the speed signal N as address into a one-dimensional map table, expressing the values of the limit torque for various values of the speed N of the engine, and in deducing therefrom, by preferably linear interpolation, a signal representative of the limit torque Clim which is compared with the measured gas torque Cg in order to deduce therefrom that the motor is pulling or driven according to whether Cg is higher or lower than Clim.

For the case in which the engine is heavily driven, the method advantageously makes it possible to deactivate misfire detection if the expected torque Cpr is less than the product of the limit torque Clim and a reducing factor less than or equal to 1, preferably constant and equal, for example, to ⅓.

Likewise, in the case of strong transients (gear changes for example), the method makes it possible to deactivate the misfire detection if the weighting coefficient becomes less than a coefficient threshold preferably constant and less than 1, for example equal to 0.7.

It is possible, in a variant, to reverse the processing of signals Cg and C ref, and to weight the values of Cg in order to compare them with interpolated but not weighted values of C ref, in all the stages of the method according to the invention.

It is also possible to substitute for the signal Pca any other signal representative of the unitary filling of the cylinders of the engine, such as an air throughput signal or signal of the opening angle of an air supply control or regulation butterfly valve.

A further subject of the invention is an apparatus for detecting misfires, intended for implementing the method specific to the invention, and as presented above, and which is characterized in that it comprises:

at least one engine rotational speed sensor delivering a speed signal N, at least one air inlet manifold pressure sensor, delivering a corresponding signal for each cylinder of the engine, at least one engine phase sensor, making it possible to identify each cylinder of the engine, means for calculating the gas torque Cg, from the engine speed signal N, memory means for storing maps and thresholds, calculating means and comparison means making it possible to calculate and/or store values of the reference torque C ref, of the expected torque Cpr, of the weighting coefficient, of the Cg/Cpr ratio, of the difference Cpr−Cg, and to compare them with thresholds in order to determine the presence of misfires.

BRIEF DESCRIPTION OF THE DRAWINGS

The invention will be better understood, and other advantages and characteristics of the invention will emerge on reading the description given below, in a non-limiting way, of an embodiment described by reference to the attached drawings in which:

FIGS. 1 to 3 represent the three complementary parts of the same block diagram representing the stages of the method and the means used to implement, for detecting misfires in a four-cylinder engine with four strokes per engine cycle, at least the ignition and injection of which are controlled by an engine monitoring system.

DESCRIPTION OF THE PREFERRED EMBODIMENTS

Figure 1:
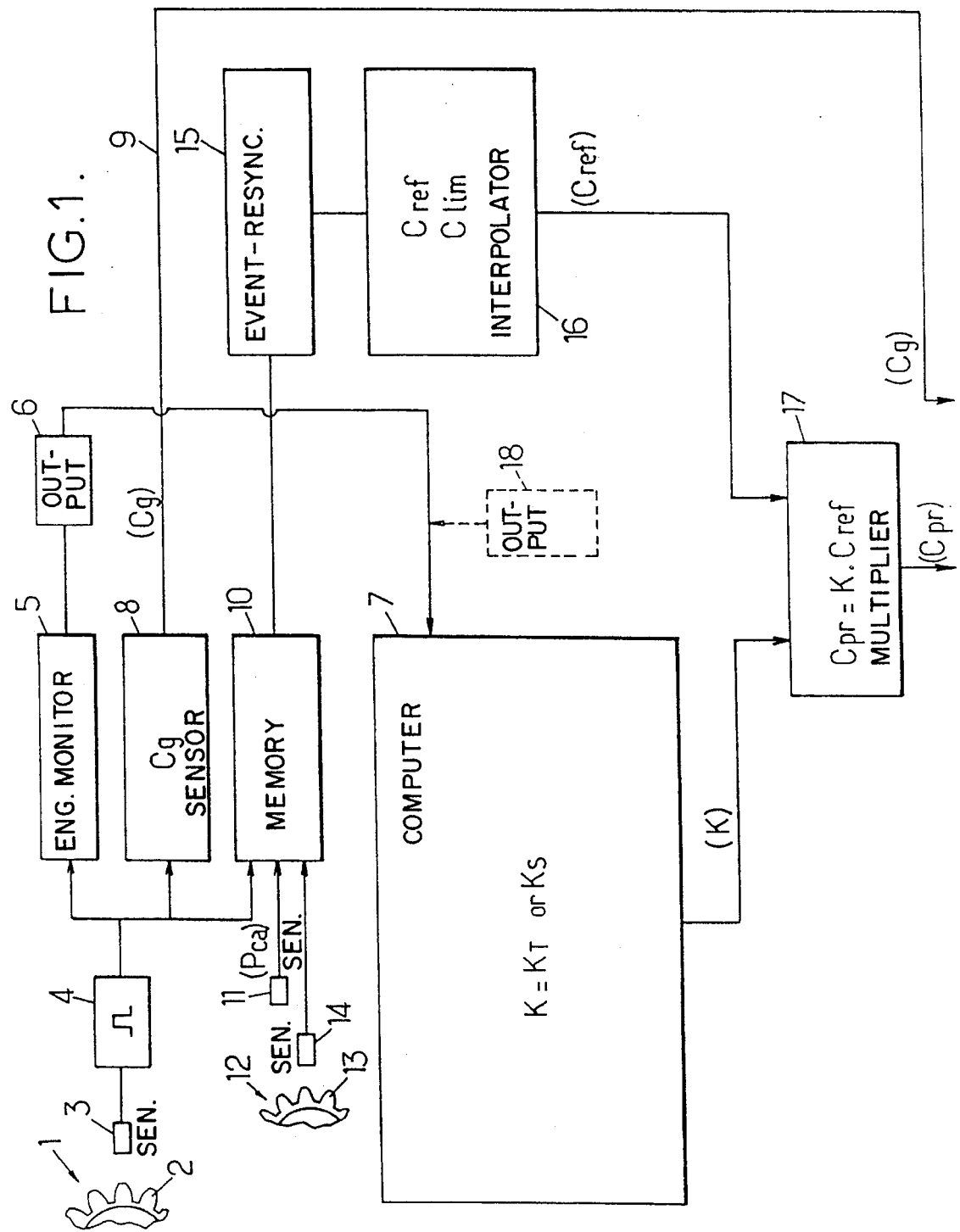

FIG. 1, at 1 represents an engine rotational speed or regime detector, of a well known type, already equipping the majority of motor vehicle equipped with an electronic engine monitoring circuit, and comprising a toothed wheel 2 integral in rotation with the flywheel or the crankshaft of the engine, as well as a sensor 3 fixed to the engine, the detector I being of the variable-reluctance type, in which the sensor 3 is sensitive to the teeth of the wheel 2 passing opposite, and delivers a pulsed electrical signal of variable frequency which is proportional to the speed of the engine, this signal being shaped in a circuit 4 delivering the engine speed signal N to the rest of the device. In particular, the speed signal N is delivered to the engine monitoring unit 5, controlling the injection and the ignition of the engine, and which is linked roan output stage 6 in which there is available a signal representative of the steady-state or transient mode of operation of the engine. This signal (steady-state or transient mode) is sent to a weighting coefficient K computer 7, the function of which is described below.

In parallel with the engine monitoring 5, the speed signal N is sent to a stage 8 for calculating the gas torque Cg produced by each combustion-expansion phase in each cylinder of the engine, for all the cycles of the latter. The stage 8, called gas torque software sensor, is thus a computer which calculates the gas torque measured on the basis of the speed signal N alone. With the engine being of the sort including measurement markers, such as the teeth of the wheel 2, arranged on a wheel or crown secured to the flywheel or crankshaft, means, such as teeth of a particular width of the wheel 2, for defining a reference for indexing the markers, and a sensor 3 of the passage of the markers, which is mounted fixed in the vicinity of the wheel or crown 2, the signal processing circuit contained in the stage 8 implements a method of producing a value representative of the gas torque Cg generated by each combustion of the gaseous mixture in the cylinders of the internal combustion engine, this method, known from FR-A-2,681,425 comprising the following operations:

1) derivation of a primary value representative of the duration di of crossing by each of the markers in front of the sensor 3, 2) processing of the primary value di in order to produce two secondary values representative respectively of the mean angular speed $\Omega n$ over the markers in the course of one period of combustions in the engine, and of the projection $E\cos\phi$, on the phase reference line, of the markers belonging to the angular combustion periods of the alternating component E of the instantaneous angular speed $\Omega i$ of the markers at the frequency of the combustions in the engine, 3) the combination of these two secondary values according to the relation:

$Cg = -a.\Omega m.E\cos\phi + b.\Omega m^2$ and thus to obtain the value sought, the terms a and b being experimentally determined constants.

Thus stage 8, for each combustion-expansion phase in each cylinder of the engine, delivers on its output 9 a signal representative of the value of the gas torque Cg produced in the corresponding cylinder by the corresponding combustion.

In parallel with the engine monitoring 5 and with stage 8, the speed signal N is sent to a memory stage 10 including shift registers, having a minimum storage capacity corresponding to three successive phases of the engine cycle. This stage 10 also receives, from a corresponding sensor 11, a signal representative of the air supply pressure Pca at the inlet manifold, as well as an engine phase signal, making it possible to identify each cylinder, and which is received from an engine phase sensor 12.

The engine phase sensor 12 is of a known type, similar in structure to that of the speed detector 1, and comprising a toothed wheel or crown 13 integral in rotation with a camshaft, and the teeth of which pass opposite a sensor 14, fixed to the engine.

The engine speed N signals, and inlet manifold pressure Pca signals are therefore stored in the memory-storage stage 10, in a sliding manner, for at least the last three successive phases of the engine cycle, as well as the numbers of the corresponding cylinders. The stage 10 is linked to an event-resynchronization stage 15, making it possible to search, among the speed N and Pca values stored in the stage 10, for those which correspond to a combustion-expansion phase for which the calculation of the gas torque Cg is under way in stage 8. This is because it is desired to compare the measured gas torque Cg with an expected theoretical gas torque calculated from speed and Pca values having led to this measured gas torque Cg. It is known that the gas torque Cg is the result of a combustion which took place in the preceding combustion-expansion phase, that is to say in the preceding engine half-revolution (stroke), for a four-cylinder four-stroke engine. This combustion is a function of the quantity of fuel injected which, itself, depends on the corresponding speed and Pca conditions in the course of the inlet phase (intake stroke), and in particular at the start thereof, that is to say during the third half-revolution before the calculation of the gas torque. This is the reason why the speed N and the pressure Pca are measured during the inlet phase or inlet half-revolution having preceded the combustion-expansion half-revolution in the course of the same engine cycle of the corresponding cylinder, and why the measured values are stored in stage 10 for at least three successive engine phases. Thus, for a compression-expansion half-revolution of order n, the value of the speed N and of the pressure Pca of order n–3 are sought in stage 15.

From stage 15, the values of speed and of Pca of order n–3 are input as addresses into a two-dimensional map table, contained in the map interpolation stage 16, this two-dimensional map giving the reference torque values as a function of speed values and values of Pca, which are not equidistant but bunched together in the regions of the map of the torque exhibiting marked curvatures. By linear interpolation, from the addressing values, a reference value of theoretical gas torque C ref is deduced. This reference torque map has been pre-established in steady-state regime of the engine, and is valid for all the cylinders of an engine as well as for a family of engines.

In the same stage 16, the value of the speed signal N of order n–3 is input as an address into a one-dimensional map table expressing various values of the limit torque for various values of the speed, the limit torque corresponding to the gas torque measured with zero useful torque (for the same speed), that is to say to the limit torque below which the engine is driven. By linear interpolation, in this map table of the limit torque, a value of the limit torque Clim is deduced for the value of the speed in the phase of order n–3.

Thus, in the stage 16, in order to try to make the best prediction of the gas torque supplied by the engine for each half-revolution or combustion-expansion phase of order n, a value C ref is calculated by interpolation on the basis of values of the speed N and of Pca from the half-revolution of order n–3, this interpolation being linear in the two-dimensional table in order to calculate the reference torque C ref, and, in parallel, linear interpolation is performed in the one-dimensional table expressing the limit torque as a function of the speed, in order to calculate the limit torque value Clim corresponding to the speed value N for the half-revolution of order n–3. This limit torque Clim is used to determine whether the engine is driving or driven, according to whether the calculated gas torque Cg is respectively greater than or less than Clim.

It will be understood that, in transient phase, engine driven, and/or in the event of wear of the engine, the reference torque C ref may differ substantially from the measured gas torque Cg. In order best to evaluate the torque supplied by the engine during each half-revolution, a multiplying weighting coefficient K is consequently applied to the value of the corresponding reference torque C ref. This operation is carried out in the multiplier stage 17, which receives the signal C ref from stage 16 and the coefficient K from stage 7. In the latter, the coefficient K is calculated in two different ways, according to whether the engine is operating in steady-state or transient mode, which is indicated to it on the output stage 6 of the engine monitor, as previously indicated.

In place of the output stage 6, a signal representative of the steady-state or transient operating state of the engine may be communicated to the stage 7 by the stage 18, in which the following test is carried out: the value of the reference torque C ref is considered for the half-revolution in progress, of order n, and for the previous half-revolution of order n–2. If the absolute value of the difference between these two values of C ref is greater than a threshold S1, equal for example to 3 N.m, it is concluded that the engine is in a transient state. In contrast, if the absolute value of the difference between these two values of C ref is less than the threshold S1, over at least a defined number of the last consecutive half-revolutions, for example over at least sixteen half-revolutions, which correspond to four engine cycles, then it is concluded that the engine is in a steady state.

When the stage 7 receives a signal indicating a transient state of the engine, it calculates the weighting coefficient K as being equal to the mean of a defined number of the last Cg/C ref ratios, for example a mean of the last four ratios, of order n–4, n–3, n–2 and n–1, independently of the cylinders.

Thus, in transient conditions, the coefficient K is given by the formula:

$$KT = ¼[Cg\ n{-}4/C\ ref\ n{-}4 + Cg\ n{-}3/C\ ref\ n{-}3 + Cg\ n{-}2/C\ ref\ n{-}2 + Cg\ n{-}1/C\ ref\ n{-}1]$$

In contrast, in steady-state conditions, K is a mean for example of the last four Cg/C ref ratios for each cylinder in question. That makes it possible to take account of the disparities between cylinders and to enhance the accuracy of the expected theoretical gas torque Cpr calculated in stage 17 by multiplying C ref by K. That also makes it possible to take account of the individual features of the toothed wheel or crown 2 of the rotational speed detector 1, for example asymmetries of the teeth of a particular width defining a reference for indexing the markers.

In steady-state conditions, for a given cylinder, the oldest Cg/C ref ratio has been calculated for the half-revolution of order n–16 since the engine is a four-cylinder engine, and since the mean of the last four ratios per cylinder is considered. The coefficient K, in steady-state conditions, is therefore given by the formula:

$$KS = ¼[Cg\ n{-}16/C\ ref\ n{-}16 + Cg\ n{-}12/C\ ref\ n{-}12 + Cg\ n{-}8/C\ ref\ n{-}8 + Cg\ n{-}4/C\ ref\ n{-}4]$$

In order to be able to calculate K, it is therefore necessary, for the first sixteen half-revolutions after starting the engine, to store Cg and C ref in memory. When this initialization phase is completed, it is then possible only to calculate K in stage 7, then to calculate the expected theoretical torque Cpr in stage 17.

Figure 2:
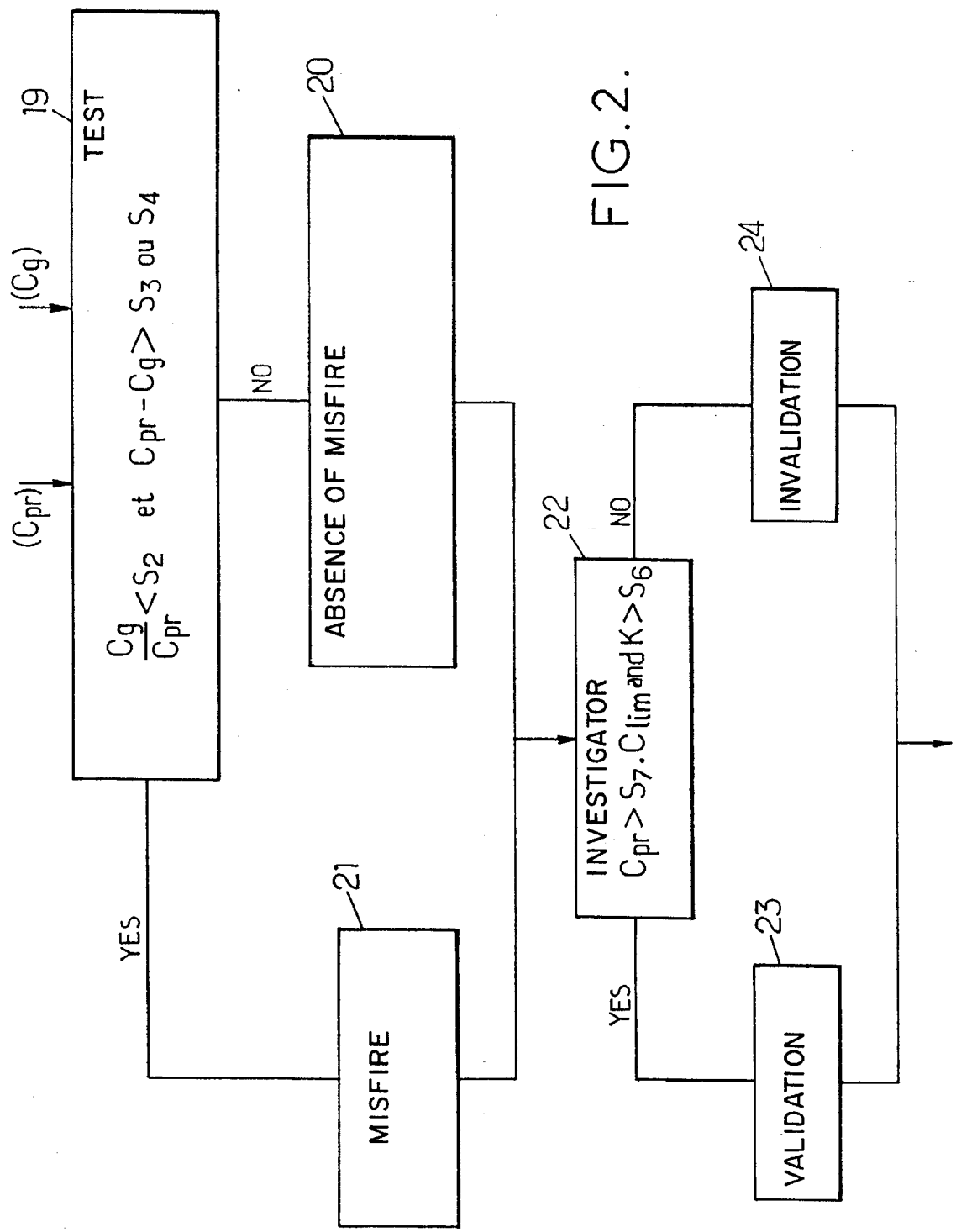

The values of Cg and of Cpr having thus been obtained, they are transmitted to the test stage 19 (see FIG. 2), where the search for a misfire is carried out by comparison between these two values.

This comparison is twofold: it consists, on the one hand, in calculating the Cg/Cpr ratio and in comparing it with a threshold S2 which is predetermined and stored in memory in stage 19, S2 being less than 1, and possibly being constant, for example equal to 0.5, in a simplified variant of the method. However, in the best embodiment known to the applicant, the threshold S2 is drawn from a map table established as a function of the motor speed N and of the pressure at the inlet manifold Pca. Moreover, the difference Cpr–Cg is compared with a predetermined minimum discrepancy threshold S3, for example a constant equal to 4 N.m in steady-state regime, and with another predetermined minimum discrepancy threshold S4, higher than the threshold S3, for example a constant equal to 15 N.m in transient regime, the thresholds S3 and S4 also being stored in memory in stage 19. In a variant, S3 and S4 are functions of the reference torque C ref.

It is concluded that there is a misfire if, simultaneously, Cg/Cpr is less than S2 and Cpr–Cg is higher than S3 or S4, according to whether the engine is operating in steady-state or transient regime.

If these two conditions are not simultaneously fulfilled, an absence of misfire is detected in the stage 20, and the values C ref and Cg of this phase of order n are stored in memory, except if Cg is higher than the product of C ref and an amplification coefficient S5 greater than 1, for example a constant equal to 1.2 which corresponds, for example, to passing an obstacle or to enhanced combustion, following a misfire on the previous engine cycle for the same cylinder, in which case the corresponding value of the expected theoretical torque Cpr is stored in place of Cg.

If the two conditions tested in stage 19 are simultaneously fulfilled, a misfire is detected in stage 21, in which the value of C ref as well as that of Cpr is stored in place of Cg for this phase of order n, so as not deliberately to falsify the following calculation of the weighting coefficient K, since the memory storage operations in stages 20 and 21 are taken into account to this end in stage 7.

Whether a misfire is or is not detected in phase n, an investigation is carried out into stage 22 as to whether the engine is driving and whether one of the three conditions applies, which lead to deactivation of the detection, these three conditions being a cutoff of injection, a weighting coefficient K less than a predetermined threshold S6 less than 1, for example a constant equal to 0.7, and a Cpr/Clim ratio less than a predetermined threshold S7, less than 1, for example a constant equal to ⅓, the thresholds S6 and S7 being stored in memory in 22. If none of these three deactivation conditions is fulfilled in 22, the detection carried out is validated at 23. In the opposite case, the detection of the misfire is invalidated, which corresponds to deactivation of the detection, in stage 24.

The results of the detections (presence or absence of misfires) are transmitted to a stage 25 known as "windowing" stage, in which, at 26, the detection results are stored for all the combustion-expansion phases of the last 1,000 engine revolutions, that is to say the detection results of the last 2,000 engine half-revolutions. These results are processed, on the one hand, in a sliding window of 200 engine revolutions 27, in which the rate of misfires is calculated, as a percentage, during the last 200 engine revolutions, that is to say in the detections carried out during the last 400 half-revolutions. On the other hand, these detection results are processed in a sliding window of 1,000 engine revolutions 28, in which the rate of misfires in the detections carried out over the last 2000 engine half-revolutions is calculated in a similar way, as a percentage.

The percentage calculated at 27 in the 200-revolution window is compared, in the comparator 29, with a predetermined and constant threshold S8, crossing of which leads, at 31, to the sending of an alarm signal testifying to degradation of the catalyst.

Likewise, the percentage measured at 28 over the 1,000-revolution window is compared, in the comparator 30, with an emission threshold S9, which is constant and, for example, of the order of 1.5%, the crossing of this threshold being indicated by a warning signal at 32, testifying to too high a level of noxious components in the exhaust gases. These alarm signals may, for example, cause a lamp to light up on the vehicle instrument panel.

In a variant, it is possible, in the method and the apparatus described above, to reverse the processing applied to the values of Cg and C ref, and thus to weight the values of the gas torque Cg so as to compare them with interpolated but not weighted values of the reference torque.

Each of the two variables Cg and Cref may possibly be weighted in a way which is specific to it, before they are compared.

In another variant, it is possible to substitute, for taking the pressure at the air inlet manifold Pca into account, the taking into account of any other signal representative of the unitary filling of the cylinders of the engine, for example an air supply flow rate signal, or a signal of opening angle of the rotary shutter or butterfly valve controlling or regulating the supply of air to the engine.

We claim:

1. Method of detecting misfires in a controlled ignition internal combustion engine, comprising the steps of:

a) deriving, for each combustion-expansion phase in each cylinder of the engine, a signal representative of a measure of a gas torque produced in each corresponding cylinder during the corresponding combustion expansion phase, b) measuring a rotational speed of the engine and deriving (4) a signal representative of this rotational speed during at least an intake phase preceding the combustion-expansion phase of each corresponding cylinder, c) measuring a pressure at an air inlet manifold for each corresponding cylinder, and deriving a signal representative of this pressure during at least the intake phase preceding the combustion-expansion phase of the corresponding cylinder, d) entering speed and inlet manifold pressure signals as addresses in a map of reference theoretical gas torque, and deducing therefrom a signal representative of a reference torque, e) assigning the reference torque a multiplier weighting coefficient associated with each corresponding cylinder and/or a steady-state or transient operating mode of the engine, and deducing therefrom a signal representative of an expected theoretical torque, and f) comparing the signals of the measured gas torque and of the expected theoretical torque and concluding that there is a misfire when a ratio of the gas torque to the expected theoretical torque becomes less than a defined ratio threshold.

2. Method according to claim 1, wherein said concluding step in f) includes the step of drawing the defined ratio threshold from a map drawn up as a function of the rotational speed of the engine and of the pressure at the air inlet manifold.

3. Method according to claim 1, and further including in f) the step of concluding that there is a misfire if a difference between the expected theoretical torque and the gas torque is greater than one or another of two defined difference thresholds according to whether the engine is operating in steady-state or transient mode.

4. Method according to claim 1, wherein said deriving step of a) includes deriving the signal representative of the measured gas torque from the rotational speed signal.

5. Method according to claim 1, wherein said deducing step of d) includes deducing the reference torque signals from a map of overall torque for all of the cylinders of the engine, valid for a family of engines, this map being preestablished in a steady-state regime of the engine and stored in a memory in the form of a two-dimensional map table expressing values of the reference theoretical gas torque for various values of the rotational speed of the engine and the pressure at the inlet manifold (Pca), which values are chosen in order to optimize a calculation of the reference torque by linear interpolation.

6. Method according to claim 1, wherein said assigning step of e) includes the step of recalculating the weighting coefficient for each combustion-expansion phase of the cylinders and according to whether the engine is operating in a steady-state or transient mode.

7. Method according to claim 6, wherein said assigning step of e) includes the step of calculating the weighting coefficient as being equal, in the transient mode, to a mean of a defined number of last consecutive gas torque to reference torque ratios, independently of the cylinders, and, in steady-state mode, as being equal to a mean of a defined number of a last consecutive gas torque to reference torque ratios for a selected cylinder corresponding to a selected combustion-expansion phase.

8. Method according to claim 6, wherein in the transient mode, a weighting coefficient KT is calculated according to the formula:

$$KT = \tfrac{1}{4}(Cg\ n{-}4/C\ ref\ n{-}4 + Cg\ n{-}3/C\ ref\ n{-}3 + Cg\ n{-}2/C\ ref\ n{-}2 + Cg\ n{-}1/C\ ref\ n{-}1)$$

in which "n" indicates an order of the combustion-expansion phase for a 4-cylinder engine.

9. Method according to claim 6, wherein in the steady-state mode, a weighting coefficient KS is calculated according to the formula:

$$KS = \tfrac{1}{4}(Cg\ n{-}16/C\ ref\ n{-}16 + Cg\ n{-}12/C\ ref\ n{-}12 + Cg\ n{-}8/C\ ref\ n{-}8 + Cg\ n{-}4/C\ ref\ n{-}4)$$

in which "n" indicates an order of the combustion-expansion phase for a 4-cylinder engine.

10. Method according to claim 6, wherein, in order to determine whether the engine is operating in the steady-state or transient modes, said assigning step of e) includes the step of using a signal representative of an operating mode supplied by an engine monitoring system controlling an injection of the engine.

11. Method according to claim 6, wherein said assigning step of e) includes the step of determining the steady-state or transient operating mode of the engine on the basis of a difference between two reference torque values, one reference torque value calculated for a selected combustion-expansion phase, and the other reference torque value calculated for a last but one preceding the selected combustion-expansion phase, and in concluding that the mode is transient if this difference is greater than a defined mode threshold and steady-state if this difference is less than the mode threshold for a defined number of consecutive engine cycles.

12. Method according to claim 7, wherein said assigning step of e) includes the steps of storing in memory a defined number of latest successive values of the gas torque and of the reference torque which are necessary for calculating the weighting coefficient, and in storing the corresponding calculated value of the expected torque in place of a value of the gas torque if, for this value of the gas torque, a misfire is detected or if no misfire is detected but this value of the gas torque is higher than a product of a corresponding value of the reference torque by an amplification factor.

13. Method according to claim 1, for an engine equipped with a catalyst, and further including the steps of:

measuring a number of misfires or misfire rates, which misfire or misfire rate measurements are detected during sliding windows of respectively N1 and N2 engine revolutions, comparing each of the misfire or misfire rate measurements with at least one threshold, specific to each window, and giving an alarm signal corresponding to a critical state of the catalyst when a crossing of one of the thresholds specific to the window of N1 revolutions occurs, and/or giving an alarm signal corresponding to a crossing of a threshold for emission of noxious components in exhaust gases when a crossing of one of the thresholds specific to the window of N2 revolutions occurs.

14. Method according to claim 1, and further including the step of deactivating a detection of the misfires in an injection cutoff phase and/or in engine driven phase, this engine driven phase being detected when the pressure at the inlet manifold becomes less than a pressure threshold which is a function of the rotational speed of the engine and/or when the gas torque measured is less than a limit torque.

15. Method according to claim 14, wherein said entering step of d) includes entering the speed signal as an address into a one-dimensional map table, expressing values of the limit torque for various values of the speed of the engine, and in deducing therefrom a signal representative of the limit torque which is compared with the measured gas torque in order to deduce therefrom that the engine is pulling or driven according to whether the gas torque is higher or lower than the limit torque.

16. Method according to claim 15, and further including the step of deactivating a misfire detection if the expected torque is less than a product of the limit torque and reducing factor less than or equal to 1.

17. Method according to claim 15, and further including the step of deactivating a misfire detection if the weighting coefficient becomes less than a coefficient threshold.

18. Method according to claim 1, wherein said entering step of d) includes substituting for the inlet manifold pressure signal another signal representative of a unitary filling of the cylinders of the engine.

19. Method according to claim 1, and further including the steps of reversing a processing of the gas torque and reference torque signals, and weighting values of the gas torque in order to compare the weighted values with interpolated but not weighted values of the reference torque, in the corresponding comparing step of f).

20. Apparatus for detecting misfires of a controlled ignition internal combustion engine, comprising:

at least one engine rotational speed sensor delivering an engine speed signal, at least one air inlet manifold pressure sensor, delivering a corresponding signal for each cylinder of the engine, at least one engine phase sensor for identifying each cylinder of the engine, means for calculating a gas torque from the engine speed signal, and memory means for storing maps and thresholds, a calculating means and storing values of a reference torque of an expected torque of a weighting coefficient, of a gas torque to expected torque ratio, of a difference of expected torque and gas torque and a comparing means for comparing the values with the thresholds in order to determine a presence of misfires.

* * * * *